US008954386B2

(12) United States Patent
Edmiston et al.

(10) Patent No.: US 8,954,386 B2
(45) Date of Patent: Feb. 10, 2015

(54) LOCALLY EDITING A REMOTELY STORED IMAGE

(75) Inventors: Gregory Matthew Edmiston, Seattle, WA (US); Ojiakonobi Udezue, Sammamish, WA (US); Harry Phillip Ferguson, IV, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 259 days.

(21) Appl. No.: 13/053,393

(22) Filed: Mar. 22, 2011

(65) Prior Publication Data

US 2012/0246114 A1 Sep. 27, 2012

(51) Int. Cl.
*G06F 17/30* (2006.01)
*G06T 11/60* (2006.01)

(52) U.S. Cl.
CPC ............ *G06T 11/60* (2013.01); *G06F 17/3028* (2013.01)
USPC .................................. 707/625; 707/E17.005

(58) Field of Classification Search
USPC ......................................................... 707/625
See application file for complete search history.

(56) References Cited

U.S. PATENT DOCUMENTS

| | | | |
|---|---|---|---|
| 6,292,619 B1 | 9/2001 | Fujita et al. | |
| 7,315,386 B1 * | 1/2008 | Shiimori et al. | ............. 358/1.15 |
| 7,602,973 B2 | 10/2009 | Ii | |
| 7,631,252 B2 | 12/2009 | Hertzfeld et al. | |
| 7,643,065 B2 | 1/2010 | Mikawa | |
| 2005/0168775 A1 * | 8/2005 | Liu | ............................... 358/1.15 |
| 2006/0268100 A1 * | 11/2006 | Karukka et al. | ........... 348/14.01 |
| 2007/0168413 A1 * | 7/2007 | Barletta et al. | ................ 709/203 |
| 2008/0016472 A1 * | 1/2008 | Rohlf et al. | ..................... 715/848 |
| 2008/0285892 A1 * | 11/2008 | Sposato et al. | ................ 382/311 |
| 2011/0083090 A1 * | 4/2011 | Gwiazda et al. | .............. 715/769 |
| 2012/0290601 A1 * | 11/2012 | Huang | ........................... 707/769 |

OTHER PUBLICATIONS

Jeff Carlson, The Adobe Photoshop Express Beta Pocket Guide, published by Peachpit Press, Jun. 22, 2008, pp. 2, 13, 20-23, 42-48, 88, and 90.*
Jeff Carlson, The Adobe Photoshop Express Beta Pocket Guide, published by Peachpit Press, Jun. 22, 2008, pp. 5-7.*
"Aurigma online image editor", Retrieved at << http://scripts.filehungry.com/product/asp/image_manipulation/aurigma_online_image_editor/ >>, Retrieved Date: Dec. 31, 2010, pp. 2.

* cited by examiner

*Primary Examiner* — Shyue Jiunn Hwa
(74) *Attorney, Agent, or Firm* — Tom Wong; Jim Ross; Micky Minhas (57) ABSTRACT

One or more techniques and/or systems are disclosed for editing a remotely stored image. A user can browse to a site comprising the image, and a preview (e.g., lightweight) version of the image can be loaded to a canvas component of the browser. One or more edits can be applied locally to the preview image, comprising one or more transformation. The one or more transformations can be recorded, and an edited version of the preview image, comprising the one or more image transformations, can be rendered in the canvas component. Once the user commits to one or more transformations, a request can be sent to a remote server comprising the image, to remotely edit the image, where the request comprises one or more delta changes that indicate the one or more committed image transformations, as opposed to requiring multiple bandwidth intensive transfers of the entire image.

20 Claims, 7 Drawing Sheets

LOCALLY EDITING A REMOTELY STORED IMAGE

BACKGROUND

Digital media, such as images, can be collected and stored locally by a user. For example, the user can take a photograph and store the photograph on the user's local machine (e.g., desktop, laptop, handheld computer, smartphone, etc.). Further, the user can later view and edit the image locally, such as by using an image processing application resident on their local machine. For example, the user may view a collection of locally saved images, and adjust characteristics of one or more of the images, such as brightness, contrast, rotation, focus, color, etc. Users can also store image remotely, such as on a remote storage sever of a remote storage service. As an example, the user can access remotely stored images by navigating to a website comprising the storage service. In this example, the remotely stored images can be downloaded to the user's local machine for image editing, and uploaded back to the remote storage service.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Currently, in order to edit an image that is stored remotely from a user's client device the image is downloaded to the client device from a remote server comprising the image, the user performs desired edits using locally available programming, and the edited image is uploaded back to the remote storage server. Editing remotely stored images in this manner may require substantial bandwidth, as the client device downloads a full-sized version of the image; the entire editing process may be moderately slow, as the full-sized image is process locally, which depends on the local device's CPU and/or other factors; and image fidelity may be moderately compromised due to recompression of the full-sized image for uploading after each editing session.

Other current techniques can perform server-side editing, for example. In this example, the client device can retrieve a "view-sized" version of the image from the remote server, send edit commands to the remote server, which performs the edits remotely, reprocesses the image remotely, and sends another view-sized version to the client after each edit. Bandwidth usage for this technique may be reduced from the local editing, but is still moderate, as the "view-sized" version of the image is downloaded to the local device after respective edits. Further, the overall speed/responsiveness of the editing process may be slow, using this technique, as the client must wait for the remote server to perform the edit and download the view-sized image. Additionally, the fidelity of the output version of the edited image is low, using this technique, as the remote server typically recompresses the image after respective edit operations, which can accumulate noise in the image.

Accordingly, one or more techniques and/or systems are disclosed where remotely stored, full-sized versions of an image can be edited locally, with relatively light bandwidth usage, fast overall editing speed, and resulting in high output fidelity of the edited image. For example, the client device can retrieve a "preview" sized version of the image, merely once, on which to perform desired editing, such as in a browser. In this example, the preview image can comprise a downscaled version of the full-sized image, on which editing can be performed locally. Further, after editing locally, merely the edit commands can be sent to the remote server comprising the image, where the edits can be performed on the full-sized version of the image, for example, thereby resulting in a high-fidelity version of the edited image.

In one embodiment for editing a remotely stored image, a preview version of the image can be loaded to a canvas component of a browser, such as running on a user's local client device. The user may apply one or more edits to the preview version of the image, and the one or more edits can be recorded as one or more image transformations applied to the preview image. An edited version of the preview image, which comprises the one or more image transformations applied to the preview version of the image, can be rendered for the user to view, such as in the browser. After the user commits to the transformations, a request can be sent, such as to a remote server comprising the image, to remotely edit the image, where the request comprises one or more delta changes that indicate the one or more image transformations.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for a relatively fast, light-weight way to edit images using a web-browser, for example. A small, preview version of an image can be loaded to a client and edited locally, and the edits can also be previewed locally. Downloading and processing a small preview version can improve editing speed and mitigate bandwidth use requirements (e.g., as compared to downloading and locally edited a full-sized version of the image). Further, for example, merely edit commands can be sent back to where the image is stored remotely, and a full sized version of the image can be processed at the remote location. In this way, bandwidth use can be reduced, and edit processing speed can be increased, while performing desired edits within the browser, for example.

Figure 1:
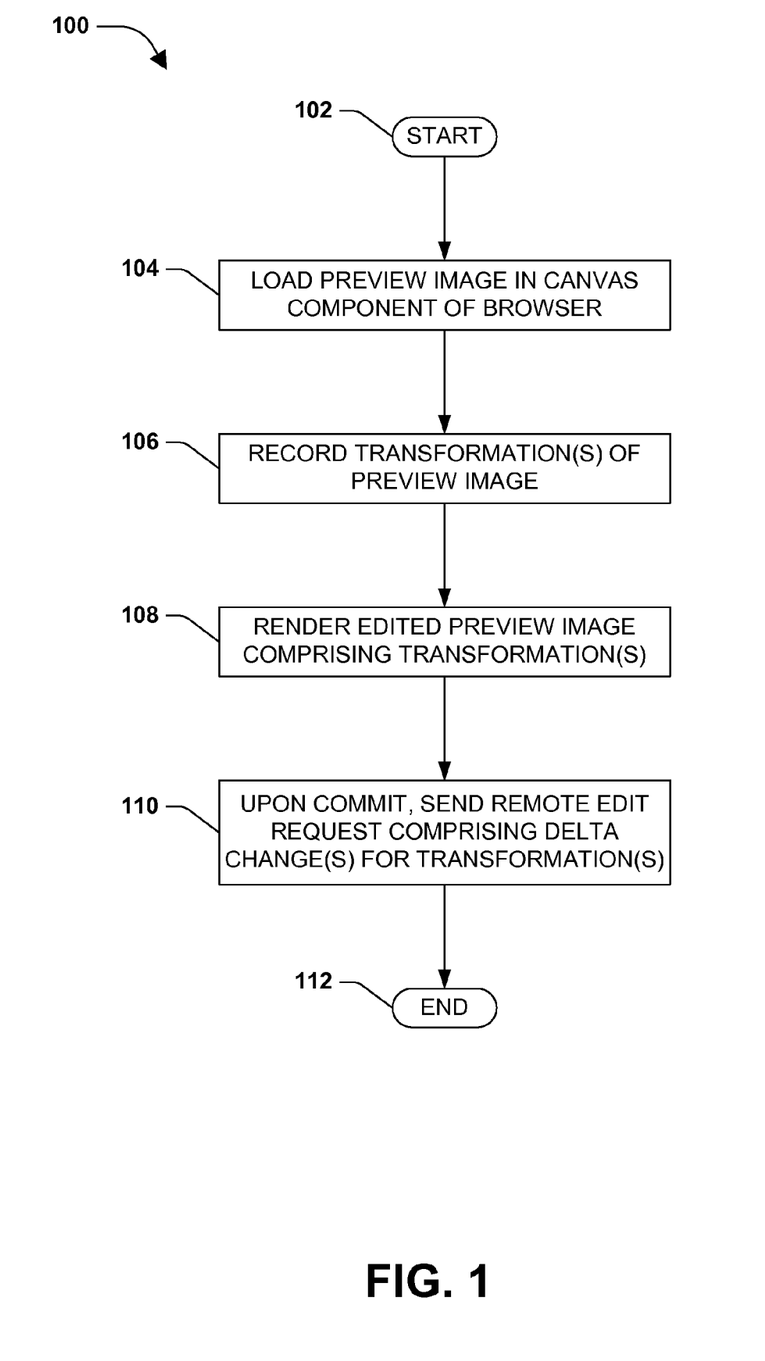
FIG. 1 is a flow diagram illustrating an exemplary method for editing a remotely stored image.

FIG. 1 is a flow diagram illustrating an exemplary method 100 for editing a remotely stored image. The exemplary method 100 begins at 102 and involves loading a preview version of the image in a canvas component of a browser, at 104. For example, the canvas component can comprise a canvas element that is part of hypertext markup language version five (HTML5), which is a procedural model that provides for rendering of two-dimensional shapes and bitmap images in a browser. The canvas component may also comprise an element in the browser, and/or a rendered webpage, that provides for rendering, and/or editing of an image.

As an illustrative example, the user may navigate their browser to a website that stores images for the user (e.g., cloud-based storage). In this example, the user can select an image to view/edit in their browser, and a preview version of the image can be loaded to the canvas component of the browser. In one embodiment, the size and/or resolution of the loaded preview image can depend on a display-type used to render the image. For example, a desktop computer monitor may comprise a higher resolution capability than a screen on a handheld computing device. In this embodiment, for example, a first version of the preview image can be loaded to the computer monitor (e.g., a higher resolution), and a second version of the preview image can be loaded to the handheld screen (e.g., a lower resolution).

At 106 in the exemplary method 100, one or more image transformations applied to the preview image are recorded. For example, the user may perform one or more edits to the preview image in the browser, where the edits can comprise the image transformations. As an illustrative example, upon rendering of the image in the browser, the user may decide to increase contrast for the image, reduce brightness, increase color, change colors, crop the image, and/or perform any one or more of many image editing actions available for the image. In one embodiment, the browser, and/or the canvas component, can provide editing tools that allow the user to apply edits to the preview version of the image, which are recorded.

At 108, an edited preview version of the image, comprising the one or more image transformations, is rendered. For example, after the user applies an edit to the preview image, an edited version of the preview image can be displayed to the user so that user may view how the applied edit may affect the image. As an illustrative example, the user can use a browser tool to adjust the contrast of the preview image in the browser, and upon application of the preview edit, the edited version showing the contrast edit can be displayed in the browser for the user to view. In this way, for example, the user may be able to decide whether the applied edit produces a desired effect on the image.

At 110, a request is sent to remotely edit the image, upon a commit to the edited preview version of the image. Here, the request comprises one or more delta changes that are indicative of the one or more image transformations. For example, the user may perform one or more edits on the preview image, and view the edited version of the preview image, one or more times until they actually commit to any one or more of the transformations.

As an illustrative example, after viewing the edited preview version of the image in the browser the user may decide not to accept the applied edit, and the edit is discarded (e.g., no longer saved/recorded). In one embodiment, when the edit is discarded the preview version of the image is re-rendered (e.g., without edits). In this example, the user may apply a different level of contrast transformation to the image, and may continue this edit-discard-edit process until they find one or more transformations that they desire to keep. The user may commit to the edit(s), such as by selecting a commit menu option in the browser, for example, and the request for the selected edit(s) can be created.

As an example, the request comprises delta changes that can identify those transformations to the preview image committed to by the user. The delta changes can comprise instructions that identify the transformation(s) to apply to a full-sized version of the image, which can be stored on a remote server, for example. Further, the request can comprise information that identifies the image at the remote location, such as a website's remote storage server, for example, that stores images for users to view and edit.

Having sent the remote edit request, the exemplary method 100 ends at 112.

Figure 2:
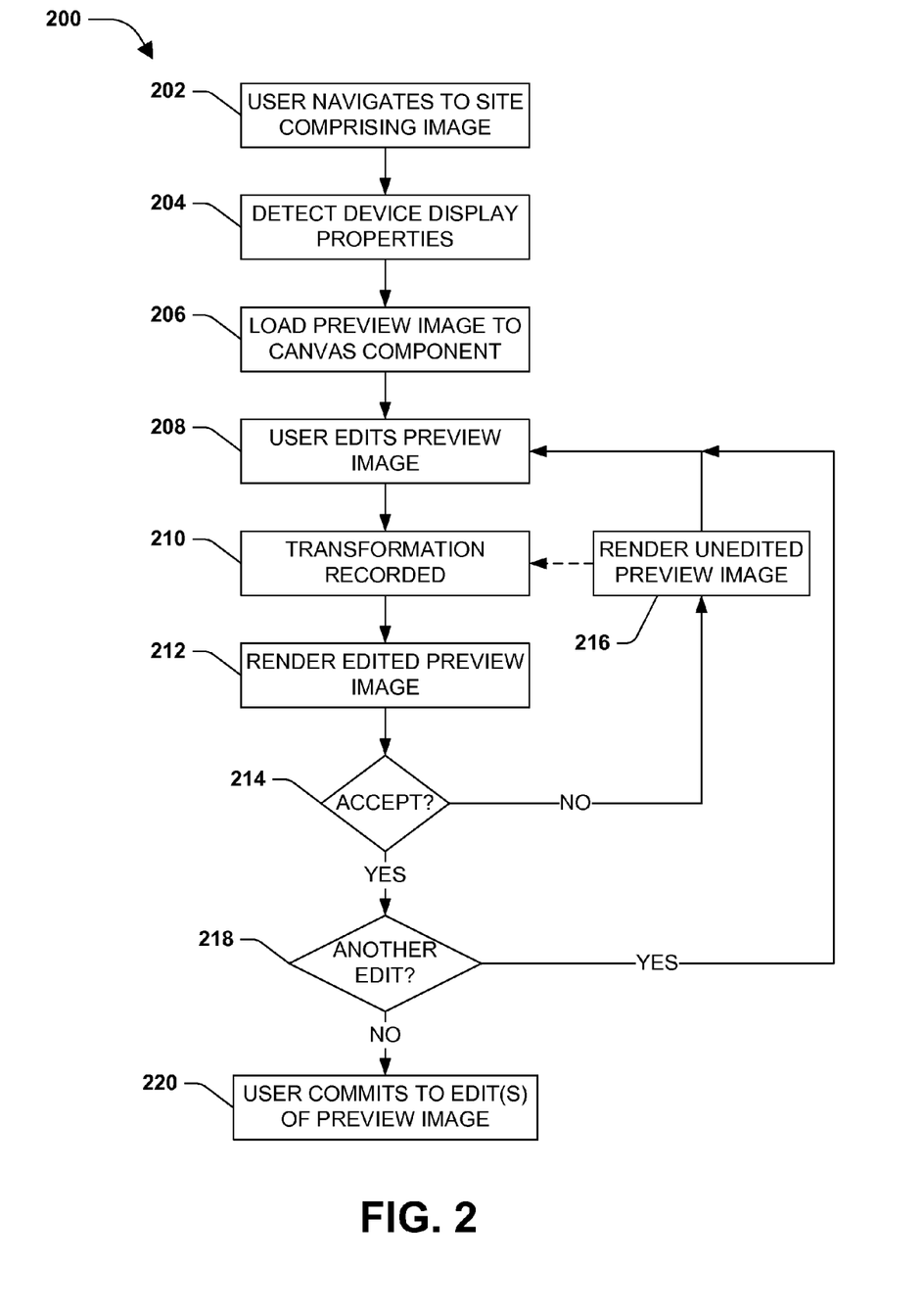
FIG. 2 is a flow diagram illustrating one embodiment of one or more portions of one or more techniques described herein.

FIG. 2 is a flow diagram illustrating one embodiment 200 of one or more portions of one or more techniques described herein. At 202, a user navigates to a website comprising an image, for example, that the user wishes to edit. It will be appreciated that the image provided for editing may not be limited to images provided and/or stored by the user, but can comprise any image available to the user in a browser (e.g., and comprises editable properties). For example, the user can browse to an online storage site, a social networking site, an Intranet location comprising images, and/or any site that provides an editable image in the browser. In this example, a full-sized (e.g., full resolution and/or size of original image) version of the image is stored remotely (e.g., on a remote server) from a client the user is utilizing to access the image.

At 204, the device display properties can be detected for the user's client device. For example, a variety of devices may be used to access images using a browser, such as a desktop computer with an attached monitor (e.g., where different monitors can comprise different display properties), a laptop computer, handheld computing device, smartphone, console device connected to a television, an Internet ready television, and more.

Respective device displays may have different display properties than others, and may even have different display properties between two of the same devices (e.g., as set by the user). In this example, the display properties for the device used by the user to display the image can be detected by a remote service providing the image and/or editing capabilities, and/or by the browser on the device. These display properties can be provided to the remote server, for example, so that an appropriate version preview version of the image may be provided.

At 206, the preview version of the image can be provided by the remote server, for example, and loaded to the canvas component of the browser. In one embodiment, loading the preview version of the image can comprise loading a reduced resolution version of the remotely stored image that is appropriate for a display device rendering the preview version of the image. For example, a full-sized version of the image may comprise a large amount of data, which can utilize a substantial amount of bandwidth to download to the client device from the remote server, and take a relatively long time to download. In this embodiment, downloading a reduced version of the image (e.g., smaller size, less resolution) can reduce bandwidth used for the download, and increase download speed. Further, the display properties of the device display may merely be able to render a reduced resolution version of the image.

At 208 in the example embodiment 200, the user can apply an edit to the preview version of the image. An edit to the image can comprise any type of transformation of the image from a first format to a second format, which may comprise changing a brightness, contrast, color, size, transparency, shape, orientation, focus, sharpness, cropping, image subject configuration, and/or more. In one embodiment, the browser and/or canvas component (e.g., HTML5 canvas element) may provide editing tools (e.g., file menu or buttons) that allow the user to perform a limited list of edits to the image. In another embodiment, an application running on the client device, or running as a web-based application (webapp) in the browser may provide editing tools to the user.

At 210, the transformation applied to the preview image can be recorded. For example, if the user applies a color adjustment to the preview image, the appropriate information for the color adjustment (e.g., what colors, how much adjustment, etc.) can be recorded locally (e.g., on the client device). In one embodiment, the browser (e.g., or component therein) may cache the transformation information in a local cache for the client device. In another embodiment, a locally running application may save the transformation information locally. Further, in one embodiment, the transformation information can comprise metadata associated with the image, and may be stored locally (e.g., with the image related information).

At 212, an edited version of the preview version of the image (edited preview image) can be rendered in the browser, such as in the canvas component. In one embodiment, transforming the preview version of the image to the edited preview image can be performed upon application of a corresponding transformation to the preview image in the canvas component. For example, when the user applies a desired edit to the preview image, the edited preview version comprising the applied edit can be rendered (e.g., automatically) in the canvas component, upon application of the edit. As another example, the rendering of the edited preview image may be performed when the user activates a preview action (e.g., using a user interface (UI) menu item or button).

At 214, the user may decide to accept or reject the transformation applied to the preview image, such as upon viewing the edited preview image. If the user rejects the transformation (NO at 214), an unedited version (e.g., that does not comprise the transformation) of the preview image can be rendered in the browser (e.g., the original version of the preview image, or a previous version of the preview image if an edit has previously been applied and accepted). In one embodiment, the rejection of the applied transformation can be recorded, at 210. For example, instructions that indicate the applied transformation (e.g., refresh the preview image) was not applied can be recorded.

The user can apply another edit to the preview image, and continue to record the transformations, view the edited preview image, and decide whether to accept the edits, at 208-214, until the user accepts a transformation to the image (YES at 214). If the transformation is accepted, the user can determine whether another edit may be applied, at 218. If the user wishes to apply a transformation to the edited preview image (e.g., apply a second transformation to the preview image comprising a first transformation), the user can apply the transformation, at 208.

The user may continue through the transformation recording, reviewing of the edited preview image and decision on transformation acceptance, at 210-214 (as above), until they have accepted the second transformation (e.g., and third, fourth, etc.). In one embodiment, recording the one or more image transformations applied to the preview image can comprise recording transformations that are performed by a user in a desired order of application. For example, if a contrast adjustment is applied first, a color adjustment second, and a cropping third, the record of the transformation stored locally may reflect the order of application of edits. Further, for example, the record of transformations may comprise a "reset image" instruction where the image transformation was not accepted, thereby returning the preview image to a previous version.

If the user has finished editing the preview image (NO at 218), the user can commit to the one or more edits to the preview image, at 220. For example, after applying one or more transformations to the preview image in the browser, the edited preview image can be rendered in the canvas component comprising the one or more edits. In this example, if the user accepts the respective one or more transformation, they may commit to the edited preview image, such as by selecting a UI menu item or button (e.g., or some other activation action) that commits the transformations for the image.

Figure 3:
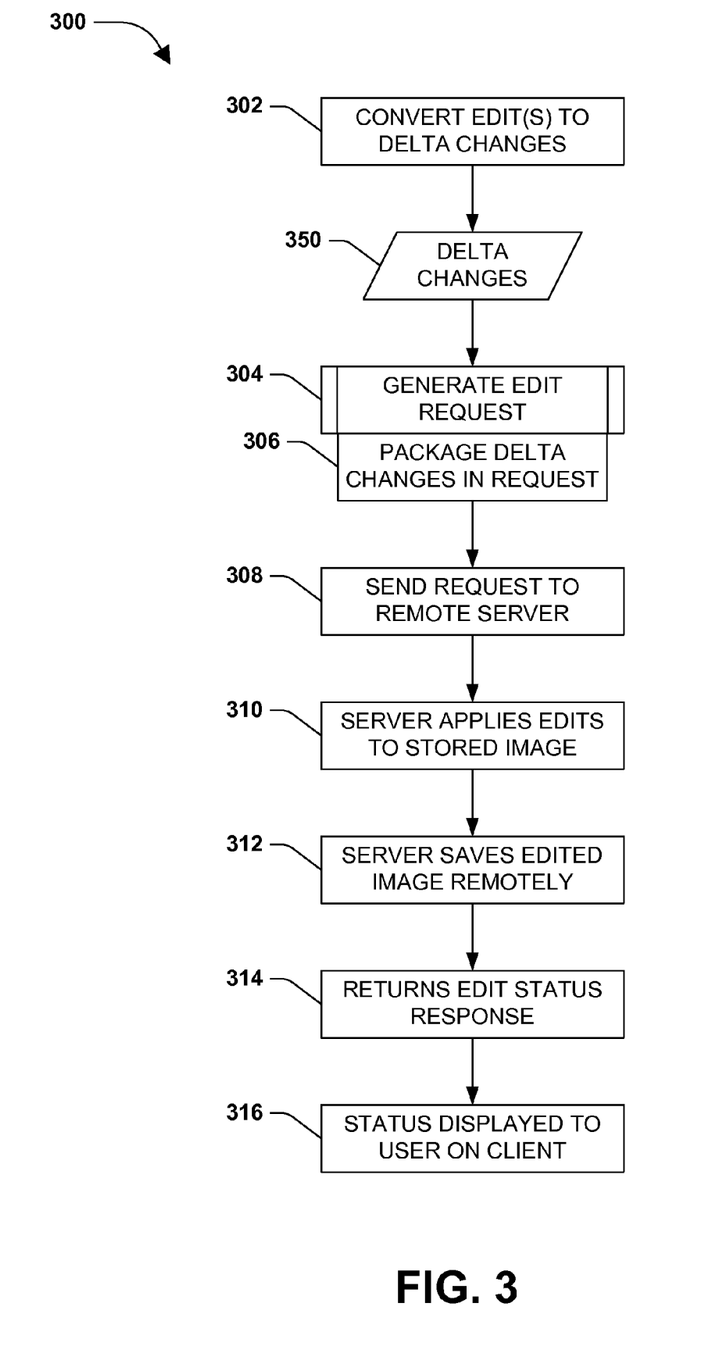
FIG. 3 is a flow diagram illustrating one embodiment of one or more portions of one or more techniques described herein.

FIG. 3 is a flow diagram illustrating one embodiment 300 of one or more portions of one or more techniques described herein. At 302, edits committed to for a preview image (e.g., from an edited preview image) can be converted to delta changes 350. For example, a delta change can comprise information (e.g., vector data, pixel data, color data, layer data, and/or image bit data, etc.) that may be used to transform a full-sized version of the image, such as stored on a remote server. In one embodiment, the one or more delta changes 350 are generated to be indicative of the one or more image transformations applied to the preview image. In this embodiment, a delta change is generated for the transformation merely if the transformation is committed for the image, such as by the user.

At 304, a request to remotely edit the image is generated. At 306, generating the request can comprise packaging the delta change(s) in the request, for example. At 308, the request can be sent to the remote server comprising the image (e.g., the full-sized version of the image). In one embodiment, generating the request can comprise generating a markup language request that instructs the remote server to read the delta changes comprised in the request. For example, the request can comprise instructions to the remote server to read the delta changes and apply them to the full-sized version of the remotely stored image. In one embodiment, the delta changes can indicate the transformations applied to the preview image, and committed for the image (e.g., instruction on how to edit the stored image in accordance with the edits applied by the user to the preview image).

In one embodiment, the request, comprising the one or more delta changes, can be generated upon the commit to the edited preview version of the image. For example, when the user views the edited preview image comprising the desired transformations, and commits to the transformations, the request can be automatically (e.g., programmatically) generated and sent to the remote server. In another embodiment, the user may be prompted (e.g., by a UI element) to generate and send the request after they have committed to the transformations of the edited preview image.

In one embodiment, a delta change (e.g., image delta instruction for the remotely stored image) can be generated by a scripting language code (e.g., JavaScript, Jscript, etc.)

resident in the website, canvas component, and/or the browser, etc. In this embodiment, for example, the scripting code can be written to record the transformation(s) for the preview image, generate the delta changes, and package them in the request sent to the remote server. Further, in one embodiment, scripting code for reading the request may be packaged with the request, such as in an extensible markup language, and sent to the remote server. Further, the remote server may comprise scripting language code (e.g., or use code packaged with the request) that allows the remote server to read the request, and apply the delta changes to the remotely stored image.

At 310 in the example embodiment 300, the remote server comprising the image can apply the edits to the stored image by reading and applying the delta changes in the request. At 312, the remote server can save an edited version of the image (e.g., the full-sized image). In one embodiment, sending the request to remotely edit the image can comprise requesting that the remote server retain an unedited version of the remotely stored image. In this embodiment, the remote server may apply the transformations indicated by the delta changes in the request, and save the edited version of the image, for example, without overwriting or deleting the unedited version of the stored image.

At 314, the remote server can return a response to the request that indicates a status of the remote editing of the image. In one embodiment, the client device (e.g., via the browser) can receive the response to the request, indicating the status of the editing of the remotely stored image. Further, at 316, the status of the remote editing can be displayed to the user in a UI element, such as in the browser. For example, the status may indicate whether the remote editing of the image was appropriately completed. In one embodiment, the status may comprise a preview of the version of the edited image saved by the remote server. In this way, for example, the user can be informed that their edits were performed as desired.

A system may be devised that provides a user with a way to edit an image in a browser, where a full-sized version of the image is stored remotely (e.g., remote from a client device used to run the browser). For example, the user may store one or more images using a remote image storage service, where the stored images comprise full-sized, and/or original format versions of the images. The remotely stored image may be edited locally, and the edit(s) can be remotely applied to the stored image, for example, without having to download the full-sized version of the image to the client device used to perform the edits. Further, for example, a preview of the edit(s) may be displayed on the client device during the editing process, so that the user can decide whether to commit to one or more of the edits, if any.

Figure 4:
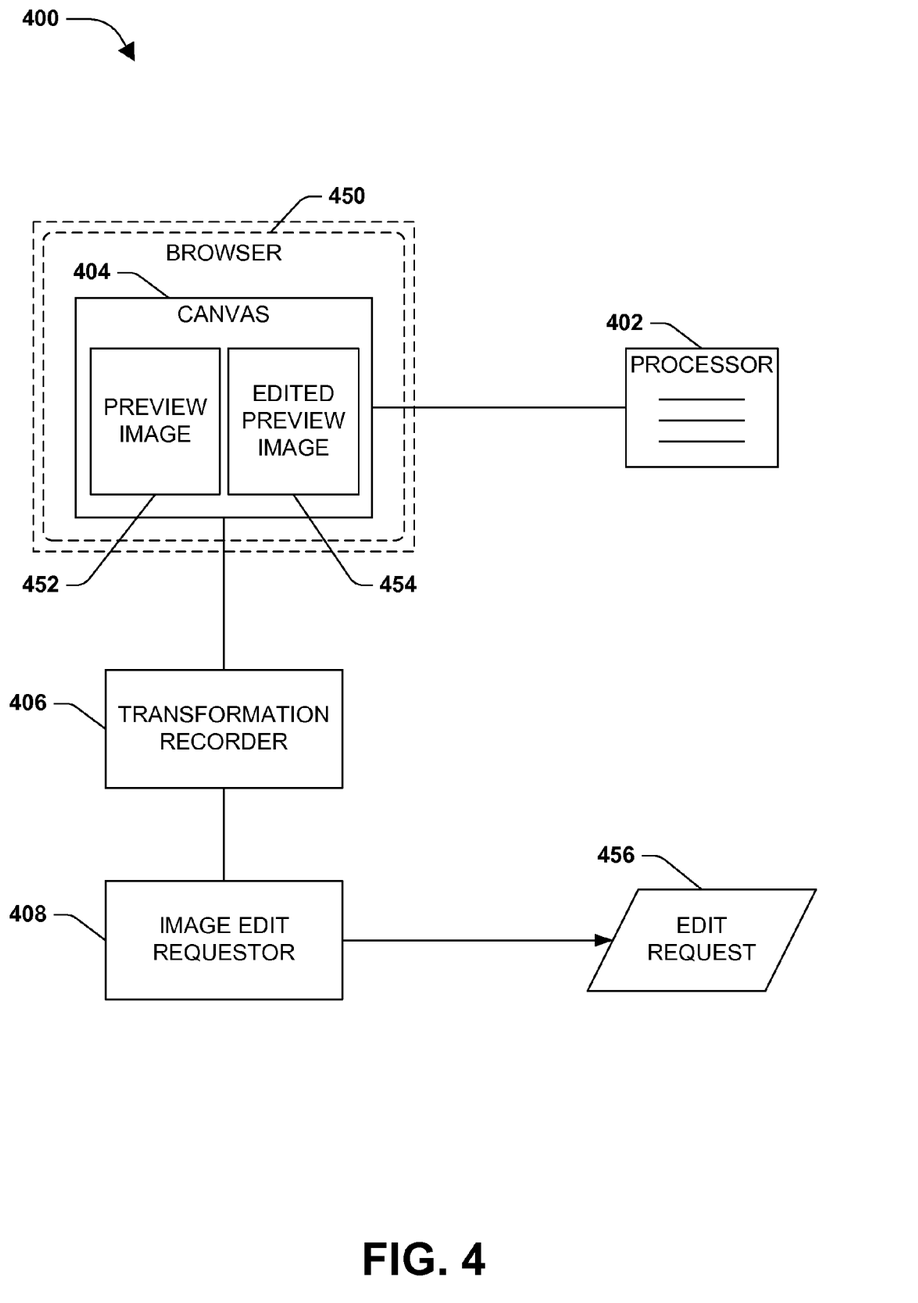
FIG. 4 is a component diagram of an exemplary system for editing a remotely stored image.

FIG. 4 is a component diagram of an exemplary system 400 for editing a remotely stored image. A computer-based processor 402 is configured to process data for the system, and the processor 402 is operably coupled with a canvas component 404. The canvas component 404 renders a preview version of the image 452 (preview image) in a browser 450, and an edited preview version of the image 454 (edited preview image) in the browser 450.

For example, the browser 450 can be resident/running on a device utilized by a user; and the user can navigate the browser 450 to a site comprising an image that the user wishes to edit. In this example, the canvas component 404 can operate in the browser to render the preview image 452, which can comprise a reduced version (e.g., reduced in size and/or resolution) of a full-sized image stored remotely, and/or the edited preview image 454 (e.g., an edited version of the reduced version of the full-sized image).

A transformation recording component 406 is operably coupled with the canvas component 404 to record an image transformation that is applied to the preview image 452 to generate the edited preview image 454. For example, the user may apply an edit to the preview image that indicates the image transformation, and the edited preview image can be generated by applying the transformation to the preview image. In this example the transformation recording component 406 can record the editing instruction(s) used to generate the transformation to the preview image.

An image edit requesting component 408 is operably coupled with the transformation recording component 406, and the image edit requesting component 408 sends a request 456 to remotely edit the image upon a commit to the edited preview image. The request 456 sent by the image edit requesting component 408 comprises one or more delta changes (e.g., instructions to edit a remotely stored, full-sized version of the image) that are indicative of one or more image transformations recorded by the transformation recording component 406. In this way, for example, the exemplary system 400 can provide for downloading a smaller version of the remotely stored image, editing the image locally, and merely sending instructions that describe how to edit the full-sized version remotely.

Figure 5:
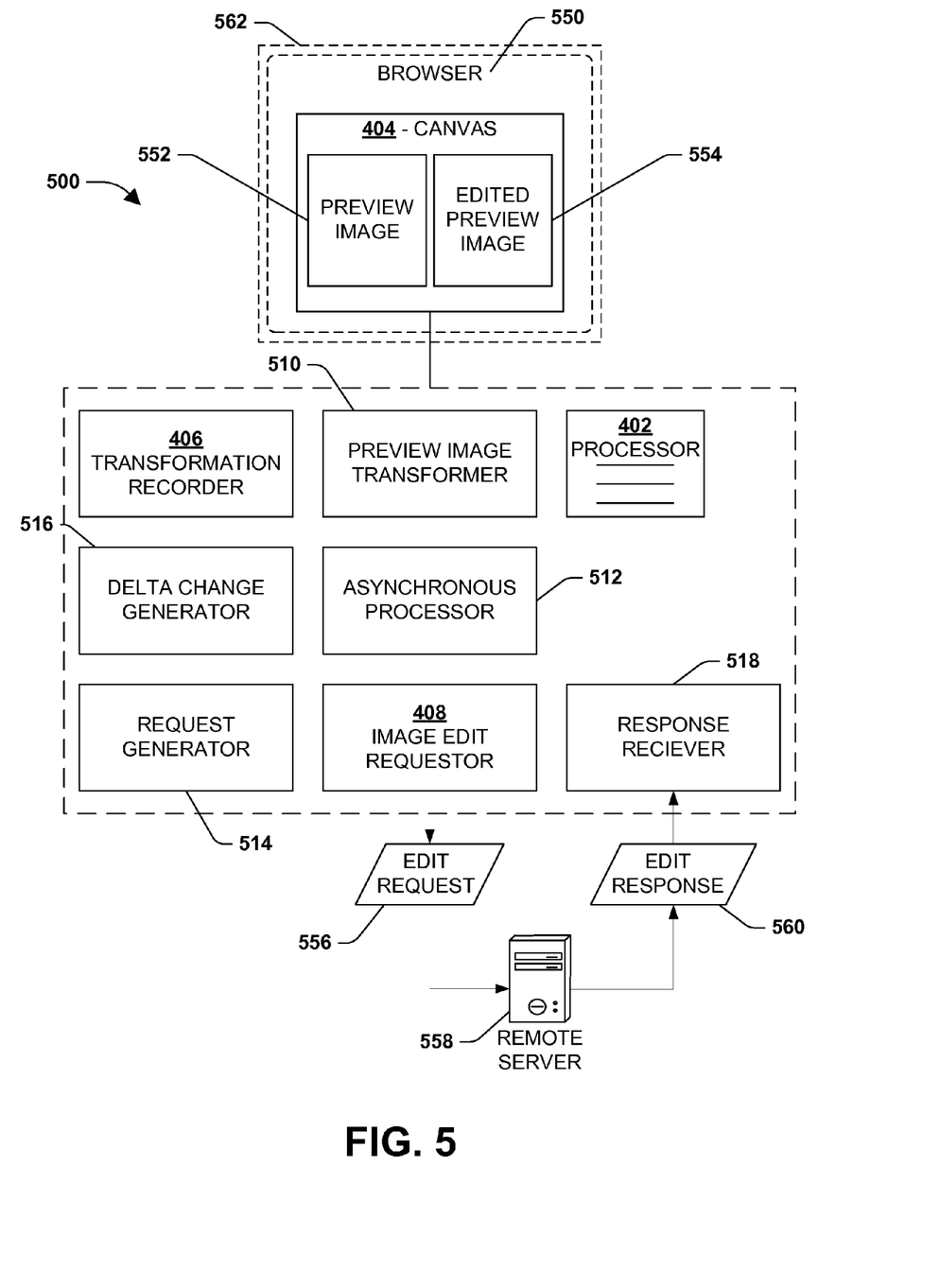
FIG. 5 is a component diagram illustrating one embodiment where one or more systems described herein may be implemented.

FIG. 5 is a component diagram illustrating one embodiment 500 where one or more systems described herein may be implemented. In this example, an extension of FIG. 4 is provided and thus description of elements, components, etc. described with respect to FIG. 4 may not be repeated for simplicity. A preview image transformation component 510 can transform a preview image 552 to an edited preview image 554 using one or more image transformations. For example, a user of a device 562 comprising a browser 550 can view the preview image 552 in a canvas component 404 and apply desired edits. The edits, as transformations, can be applied to the preview image 552 by the preview image transformation component 510 to generate the edited preview image 554, to be viewed in the canvas component 404.

An asynchronous processing component 512 can yield thread processing to the canvas component 404 to allow the canvas component 404 to respond to a user interaction. For example, when an image is being processed, such as to apply edits, thread execution of the scripting code run by the browser may continue to run, which can hang up, freeze, etc. the user interface (UI) used to display and interact with the image by the user. In one embodiment, the asynchronous processing component 512 can help add responsiveness to the canvas component, for example, allowing the scripting code model to hand back control to a UI thread occasionally, so that the UI does not fail to pass/send out a command from the user and delta changes back to be sent to a remote server 558.

A delta change generating component 516 generates the one or more delta changes from the one or more image transformations applied to the preview image 552, if the transformation is committed for the image. For example, the user of the device 562 can view the preview image 552 and apply edits. The edits, for example to the preview image 552, can be made into the delta changes for a remote edit request 556 for the image on the remote server 558 when/if the transformation(s) are committed. In one embodiment, the delta change generating component can generate the one or more delta changes for the request in order of application of the one or more transformations to the preview image. For example, as the edits are performed on the preview image 552, the delta changes can be generated from the respective edits.

A request generating component 514 can generate the request that comprises the one or more delta changes indicative of the one or more image transformations. For example, the delta changes generated by the delta change generator 516 can be packaged into the edit request 556. Further, as an example, the edit request can comprise markup language code that tells the remote server, comprising the full-sized version of the image, to read and apply the delta changes to the stored image.

A response receiving component 518 can receive a response 560 to the request 556 to remotely edit the image, where the response comprises an indication of a status of the remote editing of the image by a remote server 558. For example, the remote server 558 can receive the edit request 556 for the image, perform the requested transformations to the remotely stored image, and send the edit response 560 indicating a successful edit to the image. Alternately, if the remotely stored image is not able to be edited, or is not successfully edited, the edit response can indicate this status. In one embodiment, for example, the edit response 560 can be indicated in the browser 550 of the device 562, such as in a UI for the user. Similarly, a progress of the editing process (e.g., 70% complete) can returned as well (e.g. status bar, etc. changing (e.g., increasing) in color, length, etc. as the editing process proceeds).

Figure 6:
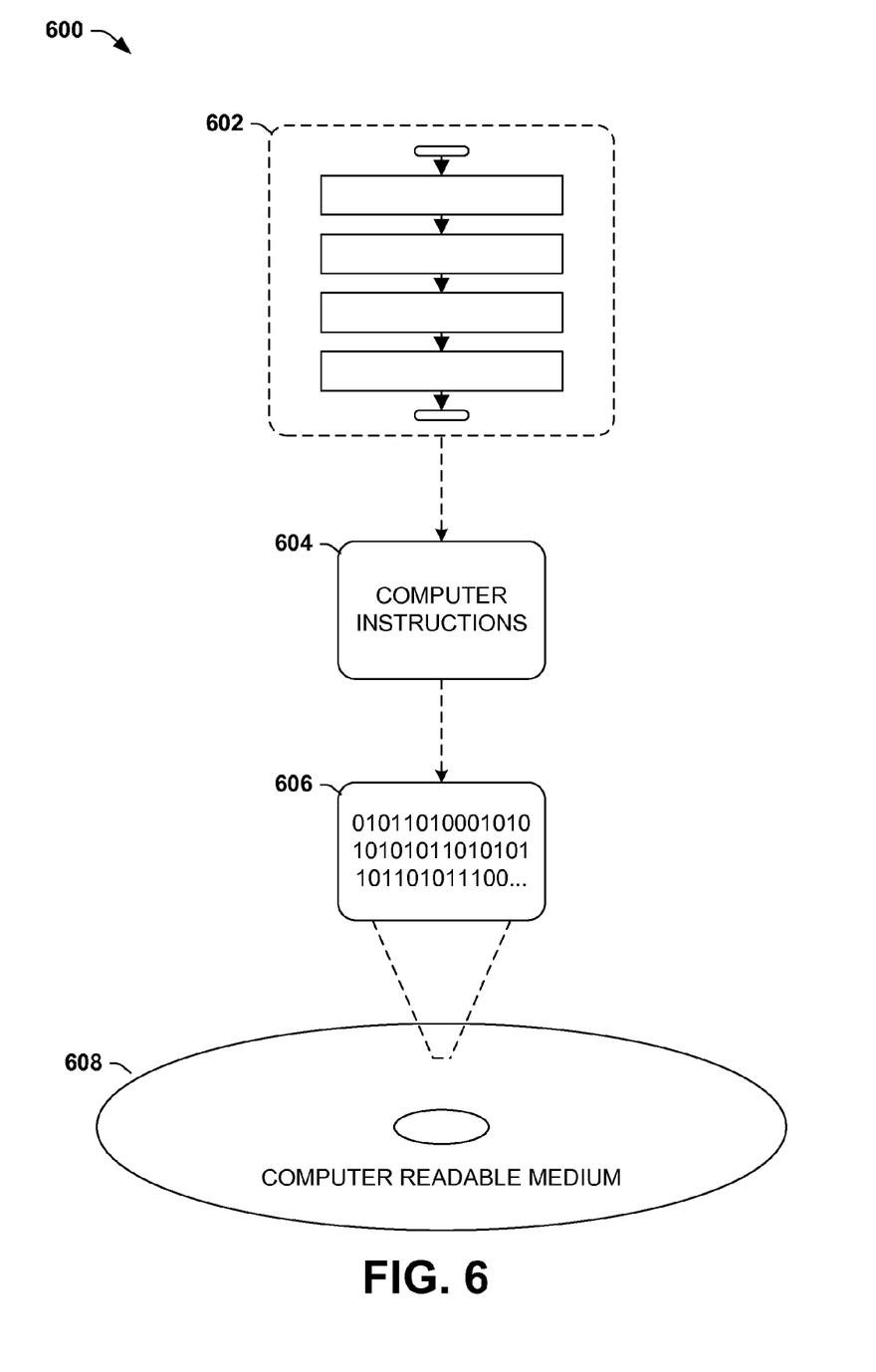
FIG. 6 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as at least some of the exemplary method 100 of FIG. 1, for example. In another such embodiment, the processor-executable instructions 604 may be configured to implement a system, such as at least some of the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
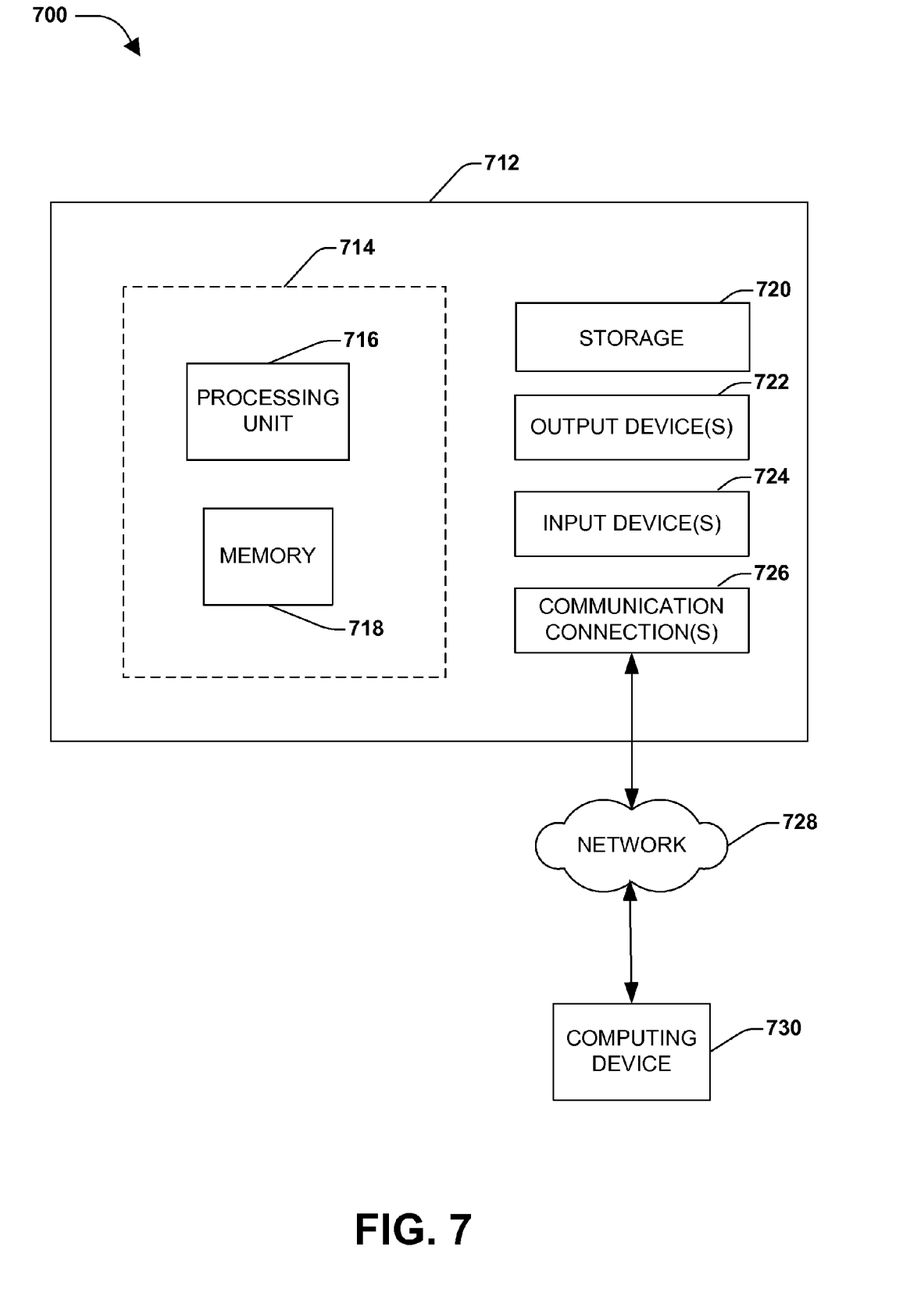
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for editing a remotely stored image, comprising:
   downloading a preview version of the remotely stored image from a server without downloading the remotely stored image from the server, the preview version smaller than the remotely stored image;
   sending a request to remotely edit the remotely stored image to the server, the request comprising:
      one or more delta changes indicative of one or more image transformations applied to the preview version of the remotely stored image downloaded from the server, the one or more delta changes associated with one or more of vector data, pixel data, color data, layer data or image bit data; and
      scripting code for reading the one or more delta changes, the request not comprising a version of the remotely stored image;
   receiving a response to the request, the response comprising an indication of a status of the remote editing of the remotely stored image; and
   yielding, by an asynchronous processing component, thread processing to a canvas component configured to render the preview version of the remotely stored image in a browser to allow the canvas component to respond to a user interaction.

2. The method of claim 1, the preview version of the remotely stored image comprising a reduced resolution version of the remotely stored image.

3. The method of claim 1, comprising recording the one or more image transformations in a desired order of application.

4. The method of claim 1, comprising transforming the preview version of the remotely stored image to an edited preview version of the remotely stored image upon application of a transformation to the preview version of the remotely stored image.

5. The method of claim 1, comprising generating the one or more delta changes indicative of the one or more image transformations.

6. The method of claim 5, generating the one or more delta changes comprising generating a delta change for a transformation responsive to the transformation being committed.

7. The method of claim 1, comprising generating the request comprising the one or more delta changes upon a commit to an edited preview version of the remotely stored image.

8. The method of claim 1, downloading the preview version comprising downloading through the browser.

9. The method of claim 1, the server storing the remotely stored image.

10. The method of claim 1, sending the request to remotely edit the remotely stored image comprising requesting that the server apply the one or more image transformations indicated by the one or more delta changes to the remotely stored image.

11. The method of claim 1, sending the request to remotely edit the remotely stored image comprising requesting that the server retain an unedited version of the remotely stored image.

12. The method of claim 1, the one or more image transformations applied through the browser.

13. A system, implemented at least in part via a processing unit, for editing a remotely stored image, comprising:
    a component configured to download a preview version of the remotely stored image from a server without downloading the remotely stored image from the server, the preview version smaller than the remotely stored image;
    an image edit requesting component configured to send a request to remotely edit the remotely stored image, the request comprising:
        one or more delta changes indicative of one or more image transformations applied to the preview version of the remotely stored image downloaded from the server, the one or more delta changes associated with one or more of vector data, pixel data, color data, layer data or image bit data; and
        scripting code for reading the one or more delta changes, the request not comprising a version of the remotely stored image;
    a response receiving component configured to receive a response to the request, the response comprising an indication of a status of the remote editing of the remotely stored image; and
    an asynchronous processing component configured to yield thread processing to a canvas component configured to render the preview version of the remotely stored image in a browser to allow the canvas component to respond to a user interaction.

14. The system of claim 13, comprising a preview image transformation component configured to transform the preview version of the remotely stored image to an edited preview version of the remotely stored image using the one or more image transformations.

15. The system of claim 14, the canvas component configured to render the edited preview version of the remotely stored image in the browser.

16. The system of claim 13, comprising a delta change generating component configured to generate the one or more delta changes from the one or more image transformations applied to the preview version of the remotely stored image.

17. The system of claim 16, the delta change generating component configured to generate the one or more delta changes in order of application of the one or more transformations to the preview version of the remotely stored image.

18. The system of claim 13, comprising a request generating component configured to generate the request comprising the one or more delta changes indicative of the one or more image transformations.

19. The system of claim 13, the preview version of the remotely stored image comprising a reduced resolution version of the remotely stored image.

20. A computer readable medium, excluding signals, comprising instructions that when executed via a processing unit perform a method for editing a remotely stored image, the method comprising:
    downloading a preview version of the remotely stored image from a server without downloading the remotely stored image from the server, the preview version smaller than the remotely stored image;
    sending a request to remotely edit the remotely stored image, the request comprising:
        one or more delta changes indicative of one or more image transformations applied to the preview version of the remotely stored image downloaded from the server, the one or more delta changes associated with one or more of vector data, pixel data, color data, layer data or image bit data; and
        scripting code for reading the one or more delta changes, the request not comprising a version of the remotely stored image;
    receiving a response to the request, the response comprising an indication of a status of the remote editing of the remotely stored image; and
    yielding, by an asynchronous processing component, thread processing to a canvas component configured to render the preview version of the remotely stored image in a browser to allow the canvas component to respond to a user interaction.

* * * * *